US012384278B2

(12) United States Patent
Suzuki et al.

(10) Patent No.: US 12,384,278 B2
(45) Date of Patent: Aug. 12, 2025

(54) VEHICLE SEAT

(71) Applicant: HONDA MOTOR CO., LTD., Tokyo (JP)

(72) Inventors: Takeyuki Suzuki, Tokyo (JP); Kohei Okimoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 308 days.

(21) Appl. No.: 18/083,626

(22) Filed: Dec. 19, 2022

(65) Prior Publication Data

US 2023/0191955 A1    Jun. 22, 2023

(30) Foreign Application Priority Data

Dec. 22, 2021   (JP) .................................. 2021-208358

(51) Int. Cl.
  *B60N 2/02*    (2006.01)
(52) U.S. Cl.
  CPC .................................. *B60N 2/0248* (2013.01)
(58) Field of Classification Search
  CPC .. B60N 2/0248; B60N 2/0272; B60N 2/0226; B60N 2/0252
  USPC ...................................................... 297/344.1
  See application file for complete search history.

(56) References Cited

U.S. PATENT DOCUMENTS

| 8,029,062 B2 * | 10/2011 | Appelqvist ............ B60N 3/063 |
| | | 297/344.1 |
| 8,573,674 B2 * | 11/2013 | Otsuka ................ B60N 2/0715 |
| | | 296/65.09 |
| 2003/0184112 A1 * | 10/2003 | Furui ................... B60N 2/3011 |
| | | 296/65.01 |

(Continued)

FOREIGN PATENT DOCUMENTS

| JP | 2017-136898 | 8/2017 |
| JP | 2018-127167 | 8/2018 |

(Continued)

OTHER PUBLICATIONS

Japanese Office Action for Japanese Patent Application No. 2021-208358 mailed Aug. 8, 2023.

*Primary Examiner* — David R Dunn
*Assistant Examiner* — Christopher E Veraa
(74) *Attorney, Agent, or Firm* — Amin, Turocy & Watson, LLP

(57)    ABSTRACT

A vehicle seat including a seat that includes a seat cushion and a seat back; an inclination drive portion configured to incline the seat back; and a slide mechanism configured to enable the seat to slide in a vehicle front-rear direction, in which the slide mechanism includes: a slide rail supporting to be able to move in a sliding manner in the front-rear direction; a slide drive portion configured to enable the upper rail to slide with respect to the lower rail; and a mode switching switch configured to enable mode switching, in the normal mode, a slide amount used by the seat when the (Continued)

vehicle is driven is used, in the relaxing mode, a slide amount at a position rearward with respect to the rearmost end in the normal mode is used, and, when the relaxing mode is switched to the normal mode, in a case where the seat back is inclined, the seat back is raised to the normal mode, and then the seat is moved forward to the normal mode.

7 Claims, 5 Drawing Sheets

(56) References Cited

U.S. PATENT DOCUMENTS

| | | | |
|---|---|---|---|
| 2009/0088930 A1* | 4/2009 | Ohtsubo | B60N 2/0252 |
| | | | 297/316 |
| 2017/0217335 A1* | 8/2017 | Tominaga | B60N 2/0252 |
| 2018/0229740 A1* | 8/2018 | Matsumoto | G06V 20/56 |
| 2018/0292821 A1* | 10/2018 | Minato | G05D 1/0061 |
| 2020/0223326 A1* | 7/2020 | Tanaka | B60N 2/02246 |
| 2022/0144148 A1* | 5/2022 | Kim | B60N 2/3065 |

FOREIGN PATENT DOCUMENTS

| | | |
|---|---|---|
| JP | 2018-176902 | 11/2018 |
| JP | 2019-038320 | 3/2019 |
| JP | 2021-183488 | 12/2021 |

* cited by examiner

VEHICLE SEAT

CROSS-REFERENCE TO RELATED APPLICATION

Priority is claimed on Japanese Patent Application No. 2021-208358, filed in Japan on Dec. 22, 2021, the entire content of which is incorporated herein by reference.

BACKGROUND OF THE INVENTION

Field of the Invention

The present invention relates to a vehicle seat.

Description of Related Art

Conventionally, there is a vehicle seat provided with a slide mechanism that allows a seat body to move in a sliding manner along a front-rear direction. The slide mechanism includes a pair of left and right upper rails provided on a lower surface of the seat body, and lower rails fixed to the vehicle body floor via feet and supporting each of the aforementioned upper rails to be able to move in a sliding manner. The slide mechanism was constituted to be movable back and forth while maintaining an inclined state in which a front end of a seat seating surface faces upward and a rear end of the seat seating surface faces downward.

With such a slide mechanism, for example, as described in Japanese Unexamined Patent Application, First Publication No. 2019-38320, the seat is moved back and forth within a range where the driver can drive, which is referred to as a driving position.

On the other hand, a relaxing position can be used in addition to the driving position in the future. That is, not only the driving position for driving for movement but also the relaxing position in which other activity time can be spent inside when the vehicle is stopped or automatically driven is provided. That is, it means that simple light work or the like can be performed in the vehicle in immediate response to an idea at that time, and the middle portion of the vehicle can be used as a private room life space. For this purpose, it is conceivable to slide the seat further rearward than the conventional driving position as the relaxing position.

SUMMARY OF THE INVENTION

However, in the above-described conventional technique, there is room for improvement in the conventional technique in that it is not assumed that the seat is slid further rearward than the range of the conventional driving position.

Furthermore, since the seat is inclined downward toward the rear side and both the upper rails and the lower rails are inclined accordingly, the center of gravity is located further on the rear side in the relaxing mode, and a loading is applied to the further rear side when the seat back is inclined rearward, and therefore, there was a problem that the slide mechanism cannot be used with the conventional constitution as it is.

An aspect of the present invention has been made in view of the above circumstances, and an object is to provide a vehicle seat capable of using a relaxing position in addition to a driving position.

In order to solve the above problems and achieve the object, the present invention adopts the aspects described below.

(1) A vehicle seat according to an aspect of the present invention includes:
a seat that includes a seat cushion and a seat back;
an inclination drive portion configured to incline the seat back; and
a slide mechanism configured to enable the seat to slide in a vehicle front-rear direction, in which
the slide mechanism includes
a slide rail that includes an upper rail fixed to the seat and a lower rail fixed to a vehicle body floor and slidably movable in a front-rear direction with respect to the upper rail, the slide rail supporting the seat to be able to move in a sliding manner in the front-rear direction;
a slide drive portion configured to enable the upper rail to slide with respect to the lower rail; and
a mode switching switch configured to drive the slide drive portion to enable switching between a normal mode during driving and a relaxing mode,
in the normal mode, a slide range of the seat in the front-rear direction is a slide amount used when the vehicle is driven,
in the relaxing mode, a slide amount is at a position where a slide position of the seat in the front-rear direction is rearward, with respect to a slide position at a rearmost end in the normal mode, and
when the relaxing mode is switched to the normal mode by the mode switch,
in a case where the seat back is inclined in the relaxing mode, the inclination drive portion is first driven to raise the seat back to an inclination position in the normal mode, and then the slide drive portion is driven to move the seat forward to the slide position in the normal mode.

(2) In the aspect (1),
in the relaxing mode,
a rear end of the upper rail may be at a slide position of the seat protruding rearward with respect to a rear end of the lower rail, and
a rear end of a gravity center range applied to the seat cushion from a seated driver in the normal mode may be set to a slide position of the seat located behind the rear end of the lower rail.

(3) In the aspect (1),
within the slide range of the seat in the front-rear direction in the normal mode,
at a foremost slide position, a front end of the upper rail may protrude forward with respect to a front end of the lower rail, and a wrap amount between the upper rail and the lower rail may be half or more of a front-rear direction dimension of the lower rail,
at a rearmost slide position, the front end of the upper rail may protrude forward with respect to the front end of the lower rail, a rear end of the upper rail may protrude rearward with respect to a rear end of the lower rail, and the wrap amount between the upper rail and the lower rail may become an entire front-rear direction dimension of the lower rail, and
at the rearmost slide position within the slide position of the seat in the front-rear direction in the relaxing mode, the rear end of the upper rail may protrude rearward with respect to the rear end of the lower rail, and the wrap amount between the upper rail and the lower rail may be ⅔ or less of a front-rear direction dimension of the lower rail.

(4) In any one of the aspects (1) to (3),
in the relaxing mode, a front-rear direction position of a hip point in the seat cushion may be set to a slide position of the seat behind a rear end of the lower rail.

(5) In the aspect (4), the seat may include a lifting portion configured to lift up a rear portion of a seat surface of the seat cushion in the relaxing mode, and when the relaxing mode is switched to the normal mode by the mode switch, in a case where the seat back is inclined in the relaxing mode, the inclination drive portion may be first driven to raise the seat back to the inclination position in the normal mode, and then the lifting portion may be driven to move the rear portion of the seat surface of the seat cushion downward to a position of the normal mode.

(6) In the aspect (5), regarding a moving speed of the seat in the front-rear direction by the slide drive portion, a moving speed at a time of switching between the normal mode and the relaxing mode may be higher than a moving speed in the normal mode.

(7) In the aspect (6), the vehicle body floor may include a footrest low floor portion hidden by the seat in the normal mode and usable by a seated driver in the relaxing mode.

According to the aspect (1), by switching from the normal mode, which is the driving position for driving, to the relaxing mode by the slide mechanism, the seat can be positioned further rearward with respect to the slide range in the normal mode, which is the conventional slide range in which the driving is possible. Hence, the relaxing mode and the static mode in which the relaxing space, which cannot conventionally be realized, is created inside the vehicle without being obstructed by a steering wheel or the like are enabled. Furthermore, although a sunroof is conventionally of a rear seat, the sunroof of the driver's seat also gives a good feeling. In addition, the mode can be switched from the normal mode to the relaxing mode only by operating the mode switching switch, and the mode can be switched from the relaxing mode to the normal mode only by operating the mode switching switch.

At this time, in a case where the seat back is inclined in the relaxing mode, when the seat is caused to slide in a state where the seat back is inclined and the seated person is in a state of leaning, the center of gravity becomes considerably on the rear side. Therefore, there is a possibility that defects such as a large deflection of the rails or a large burden on the motor of the slide drive portion or the like occur, but by first raising the seat back to the inclination position of the normal mode, moving the center of gravity to the front side, and then moving the seat forward to the slide position of the normal mode, the burden on the rails or the motor is reduced, and such defects can be avoided.

According to the aspect (2), since the rear end of the gravity center range of the seat cushion is behind the rear end of the lower rail, and even in this state, the upper rail is extended as compared with the conventional art, it is possible to realize the relaxing mode without causing defects such as a large deflection of the rails and a large burden on the motor of the slide drive portion or the like. In a state where the rear end of the gravity center range of the seat cushion is behind the rear end of the lower rail, sliding does not occur in the normal mode during driving, and thus it is not necessary to consider a loading or the like during driving. Hence, the seat is positioned further rearward with respect to the slide range in the normal mode, and light work and the like can be performed without being obstructed by a steering wheel or the like, and the relaxing mode and the static mode in which a relaxing space that cannot be realized conventionally is created inside the vehicle are enabled.

According to the aspect (3), it is possible to realize the normal mode and the relaxing mode by switching them in a state where a sufficient wrap amount with the lower rail is maintained by the upper rail extended as compared with the conventional art. Since the wrap amount and the slide amount of the upper rail and the lower rail are realized, it is possible to quickly switch between the normal mode and the relaxing mode in a state where the seat is sufficiently held and the loading resistance is provided without causing defects such as a large deflection of the rails and a large burden on the motor of the slide drive portion or the like in both modes of the normal mode and the relaxing mode.

According to the aspect (4), the front-rear direction position of the hip point is set within a predetermined range with respect to the lower rail, and the normal mode and the relaxing mode can be switched. Therefore, it is possible to provide the vehicle seat capable of performing the relaxing mode without causing defects such as a large deflection of the rails and a large burden on the motor of the slide drive portion or the like while maintaining the loading resistance in the slide mechanism.

According to the aspect (5), the lifting portion lifts up the rear portion of the seat surface of the seat cushion, so that the relaxing mode and the static mode in which a relaxing space that cannot be realized conventionally is created inside the vehicle are enabled as the relaxing mode different from the normal mode during driving. Furthermore, when the relaxing mode is switched to the normal mode, the seat back is first raised and the center of gravity is moved to the front side of the seat with respect to a state where the center of gravity is on the rear side in a state where the seated person leans on the seat back inclined in the relaxing mode, and then the rear portion of the seat surface of the seat cushion is moved downward, thereby reducing the loading on the rails or the motor of the slide mechanism with respect to the seat moving to the front side. At this time, when the rear portion of the seat surface of the seat cushion is high, the center of gravity is at a higher position than when the rear portion of the seat surface of the seat cushion is at a low position, and thus the center of gravity is located on the front side in the front-rear direction. Hence, it is possible to provide the vehicle seat capable of switching between the relaxing mode and the normal mode without causing defects such as a large deflection of the rails and a large burden on the motor of the slide drive portion or the like.

According to the aspect (6), it is possible to perform the front-rear direction moving speed of the seat at the time of mode switching in a short time with respect to the front-rear direction moving speed of the seat by the slide drive portion in the normal mode mainly focusing on adjustment of the front-rear direction position of the seat. Hence, it is possible to shorten the time for the seated person who performs the operation to wait until the switching is ended and to prevent the operator from feeling irritated. The time required for mode switching can be shortened, and the load applied to the rails and the motor of the slide mechanism can be quickly reduced.

According to the aspect (7), by moving the seat rearward to set the relaxing mode, the relaxing mode and the static mode in which a relaxing space in which the footrest low floor portion hidden at the position below the seat in the normal mode can be used, the feet of the seated person are placed, the legs are stretched as compared with the normal mode, and that cannot be realized conventionally is created inside the vehicle are enabled. At the same time, in the normal mode, the footrest low floor portion can be hidden at the position below the seat, so that there is no trouble in driving.

DETAILED DESCRIPTION OF THE INVENTION

Hereinafter, the first embodiment of the vehicle seat according to the present invention will be described with reference to the drawings.

Figure 1:
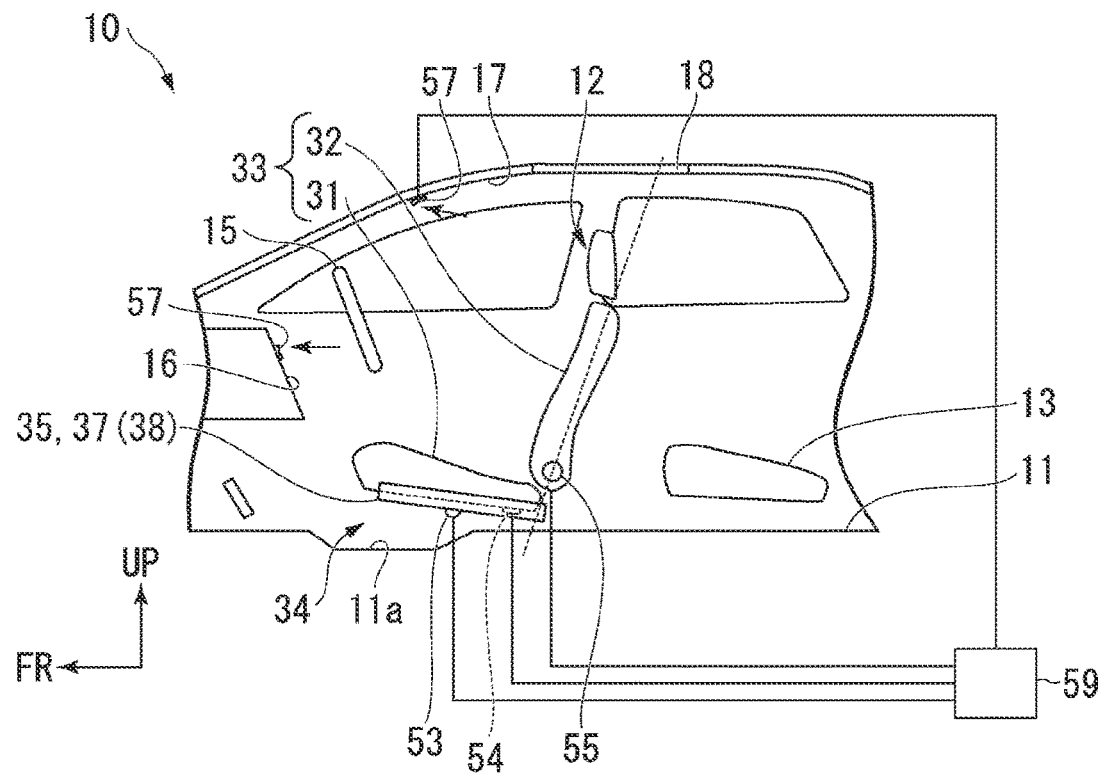
FIG. 1 is a schematic constitution diagram (side diagram) illustrating a normal mode in a vehicle including a first embodiment of a vehicle seat according to the present invention.
Figure 2:
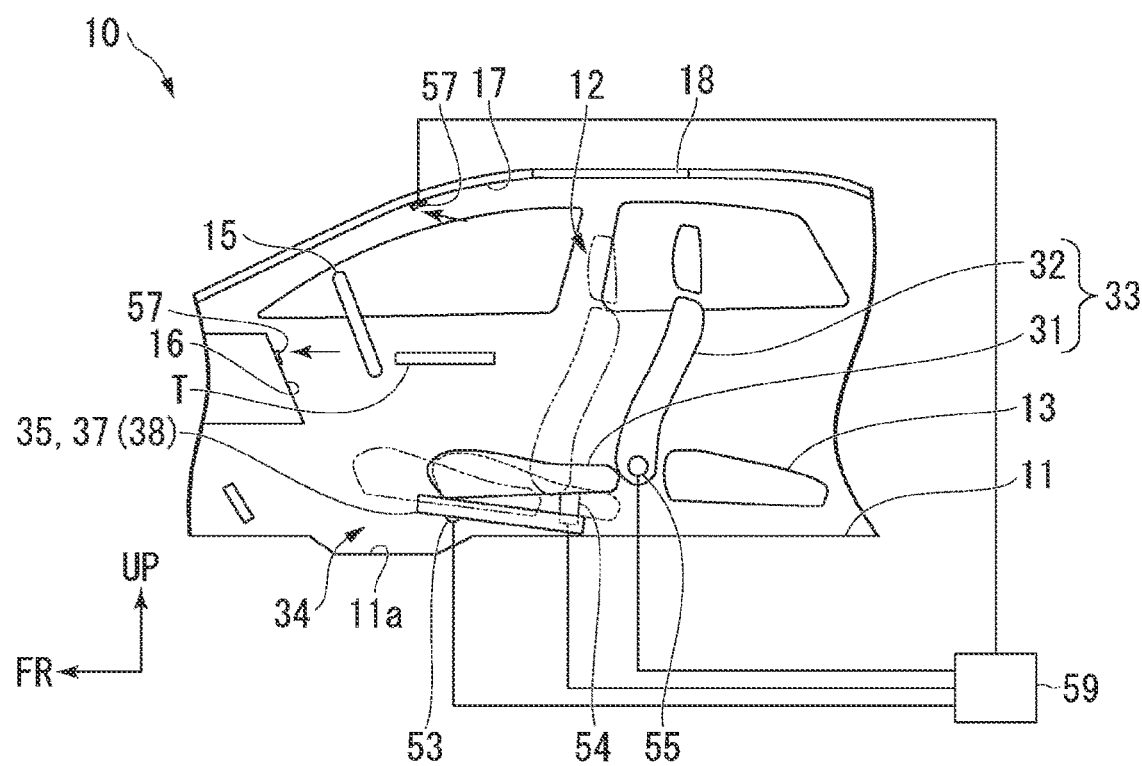
FIG. 2 is a schematic constitution diagram (side diagram) illustrating a relaxing mode in the vehicle including the first embodiment of the vehicle seat according to the present invention.

FIG. 1 is a schematic constitution diagram illustrating a vehicle including a vehicle seat in a normal mode according to the present embodiment. FIG. 2 is a schematic constitution diagram illustrating the vehicle including the vehicle seat in a relaxing mode according to the present embodiment. In the drawings, reference number denotes a vehicle. Front, rear, up, down, left, and right orientations in the description below are the same as orientations of a vehicle unless otherwise specified. In the drawings, an arrow UP indicates an upper side, and an arrow FR indicates a front side.

[Vehicle]

In the vehicle 10 according to the present embodiment, as illustrated in FIG. 1, a front row seat (vehicle seat) 12 and a rear row seat 13 are arranged on a vehicle body floor 11 of the vehicle 10 at an interval in a front-rear direction.

[Seat]

As illustrated in FIG. 1, the front row seat (seat) 12 includes a seat body 33 in which a seat back 32 is inclinably coupled to a rear end portion of a seat cushion 31, and the seat body 33 is fixed to the vehicle body floor 11 to be able to move in a sliding manner in the front-rear direction via a slide mechanism 34. Although not illustrated, a pair of left and right front row seats 12 is provided.

The front row seat (seat) 12 slides in the front-rear direction to be able to switch between a normal mode during driving illustrated in FIG. 1 and a relaxing mode illustrated in FIG. 2.

A footrest low floor portion 11a is formed on the vehicle body floor 11. The footrest low floor portion 11a is recessed to be located below the vehicle body floor 11. As will be described below, the footrest low floor portion 11a is located below the seat cushion 31 in the normal mode illustrated in FIG. 1 and is hidden by the seat cushion 31 from the seated driver but, in the relaxing mode illustrated in FIG. 2, the footrest low floor portion 11a is located in front of the seat cushion 31 and can be used for the footrest by the seated driver.

[Slide Mechanism]

The slide mechanism 34 includes a pair of left and right upper rails 35 fixed to a lower surface of the seat cushion 31, lower rails 37 fixed to the vehicle body floor 11 via feet 51 and 52 (see FIG. 3) and supporting each of the aforementioned upper rails 35 to be able to move in a sliding manner along the front-rear direction, a slide drive portion (motor) 53 that drives the upper rails 35 to slide with respect to the lower rails 37, a lifting portion 54 that moves the seat surface of the seat cushion 31 up and down, an inclination drive portion 55 that inclines and drives the seat back 32, a mode switching switch 57 that switches modes to be described below, and a control unit 59. The upper rails 35 and the lower rails 37 constitute slide rails 38 of the present embodiment.

[Slide Rail]

Since the slide rails 38 have the same constitution, one of the slide rails 38 will be described below in the description below, and the description of the other slide rail 38 will be appropriately omitted.

Figure 3:
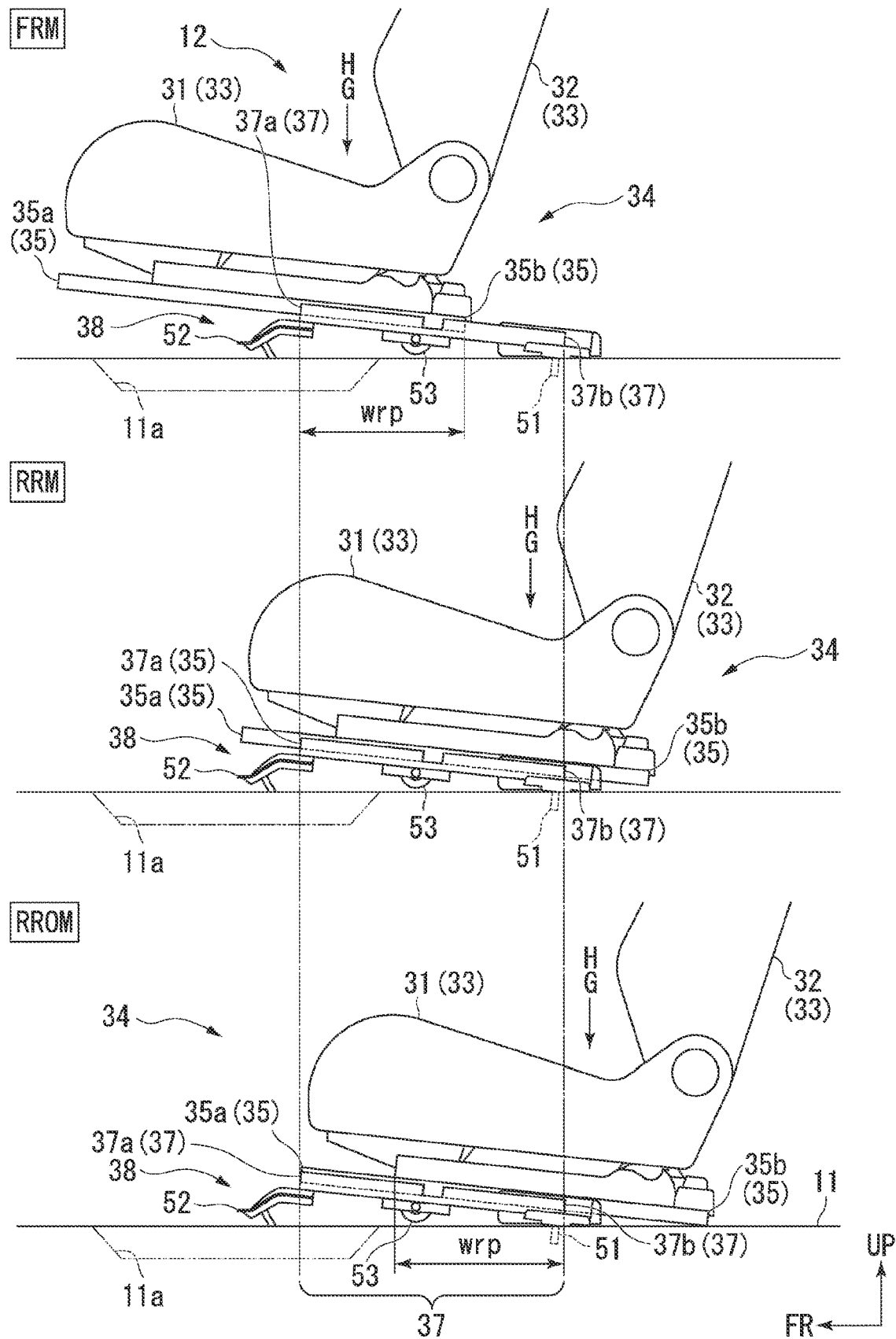
FIG. 3 is a schematic side diagram illustrating a slide position of a slide mechanism in the first embodiment of the vehicle seat according to the present invention.

FIG. 3 is a schematic side diagram illustrating a slide position of the slide rail of the vehicle seat in the present embodiment.

As illustrated in FIGS. 1 to 3, the upper rail 35 extends along the front-rear direction on the lower surface of the seat cushion 31. The upper rail 35 may include an upper base portion having a C-shaped cross section open downward. An upper surface of the upper base portion is fixed to the lower surface of the seat cushion 31 via a bracket. Upper bent walls folded outward (outer sides in left-right direction and upward) are formed at both left and right end edges of the upper base portion over the entire length of the base portion.

For example, an end cap made of resin may be attached to a front end portion 35a of the upper rail 35 from the front side. The end cap is attached so as to abut against front end edges of the upper base portion and the upper bent walls described above from the front side. The end cap prevents a metal portion of the upper rail 35 from directly interfering with the foot or the like of an occupant in the front seat.

For example, an end cap made of resin may be attached to a rear end portion 35b of the upper rail 35 from the rear side. The end cap is attached so as to abut against rear end edges of the upper base portion and the upper bent walls described above from the rear side. The end cap prevents the metal portion of the upper rail 35 from directly interfering with the foot of an occupant in the rear seat.

The lower rails 37 extend along the front-rear direction corresponding to the upper rails 35. The lower rail 37 includes a lower base portion having a C-shaped cross section open upward. Lower bent walls folded inward (inner sides in left-right direction and downward) are formed at both left and right end edges of the lower base portion. The upper rail 35 described above is accommodated in the lower base portion of the lower rail 37 from above, and the upper bent walls engage the lower bent walls of the lower rail 37. Thus, the upper rail 35 is supported to be movable in a sliding manner on the lower rail 37.

As illustrated in FIGS. 1 to 3, the upper rail 35 and the lower rail 37 are constituted to be switchable between a normal mode and a relaxing mode to be described below by sliding in the front-rear direction with respect to each other.

Specifically, as illustrated in FIG. 3, the upper rail 35 and the lower rail 37 are slidable in a slide range from a foremost position FRM to a rearmost position RRM in the normal mode and in a range to a super rear position RROM in the relaxing mode.

Hereinafter, these slide positions and the length of the slide rails 38 will be described.

The foremost position FRM illustrated in the upper part of FIG. 3 is a foremost slide position with respect to the lower rail 37 in the slide range of the seat 12 in the front-rear direction in the normal mode. The foremost position FRM is a slide position where the upper rail 35 is located on the foremost side with respect to the lower rail 37 in the normal mode. That is, the foremost position FRM is a slide position where the seat cushion 31 has moved to the foremost side in the normal mode.

The rearmost position RRM illustrated in the middle part of FIG. 3 is a rearmost slide position with respect to the lower rail 37 in the slide range of the seat 12 in the front-rear direction in the normal mode. The rearmost position RRM is a slide position where the upper rail 35 is located on the rearmost side with respect to the lower rail 37 in the normal mode. That is, the rearmost position RRM is a slide position where the seat cushion 31 has moved to the rearmost side in the normal mode.

In the normal mode, the slide position of the seat 12 in the front-rear direction is defined in the slide range between the foremost position FRM and the rearmost position RRM. That is, unless the mode switching switch 57 described below is turned on, the upper rails 35 do not move further rearward.

The super rear position RROM illustrated in the lower part of FIG. 3 is a slide position, which is a predefined position of the upper rail 35 with respect to the lower rail 37 in the relaxing mode. The super rear position RROM is a slide position located on the rearmost side within the front-rear position of the upper rail 35 with respect to the lower rail 37. That is, the super rear position RROM is a slide position where the seat cushion 31 of the slide mechanism 34 has moved to the rearmost side.

The upper rail 35 and the lower rail 37 are slidable relative to each other from their foremost position FRM to the rearmost position RRM and to the super rear position RROM, which is located on the further rear side relative to the rearmost position RRM.

As illustrated in the upper part of FIG. 3, in the slide range of the seat 12 in the front-rear direction in the normal mode, the front end 35a of the upper rail 35 protrudes forward with respect to a front end 37a of the lower rail 37 at the foremost position FRM. At the foremost position FRM, the rear end 35b of the upper rail 35 is located in the middle of the lower rail 37 in the front-rear direction. At the foremost position FRM, a wrap amount wrp between the upper rail 35 and the lower rail 37 is about half or more of a front-rear direction dimension of the lower rail 37. That is, at the foremost position FRM, a front-rear direction distance from the front end 37a of the lower rail 37 to the rear end 35b of the upper rail 35 is about ½ of the front-rear direction dimension of the lower rail 37.

As described above, at the foremost position FRM, the wrap amount wrp between the upper rail 35 and the lower rail 37, i.e., a front-rear direction length of the upper rail 35 overlapping each other in the front-rear direction and supported by the lower rail 37 is larger than ½ of a front-rear direction length of the lower rail 37. In order to realize such wrap amount wrp between the upper rail 35 and the lower rail 37, the upper rail 35 in the present embodiment is extended in the front-rear direction as compared with the conventional upper rail.

At the foremost position FRM, the upper rail 35 does not further move forward with respect to the lower rail 37. Therefore, in the slide range of the seat 12 in the front-rear direction in the normal mode, at the slide position where the upper rail 35 moves forward with respect to the lower rail 37, the wrap amount wrp at the foremost position FRM is minimized, and the wrap amount wrp is not further reduced. Therefore, the wrap amount wrp at the foremost position FRM is about ½ of the front-rear direction dimension of the lower rail 37. Hence, it is possible to have sufficient mechanical strength, impact resistance, loading resistance, and strain generation resistance in the normal mode.

As illustrated in the middle part of FIG. 3, in the slide range of the seat 12 in the front-rear direction in the normal mode, the front end 35a of the upper rail 35 protrudes forward with respect to the front end 37a of the lower rail 37 at the rearmost position RRM. At the rearmost position RRM, the rear end 35b of the upper rail 35 protrudes rearward with respect to a rear end 37b of the lower rail 37. At the rearmost position RRM, the wrap amount wrp between the upper rail 35 and the lower rail 37 is equal to the front-rear direction dimension of the lower rail 37.

As described above, at the rearmost position RRM, the wrap amount wrp between the upper rail 35 and the lower rail 37, i.e., a front-rear direction length of the upper rail 35 overlapping each other in the front-rear direction and supported by the lower rail 37 is equal to the entire length of the lower rail 37 in the front-rear direction. In order to realize such wrap amount wrp between the upper rail 35 and the lower rail 37, the upper rail 35 in the present embodiment is extended in the front-rear direction as compared with the conventional upper rail.

At the rearmost position RRM, as the normal mode, the upper rail 35 does not further move rearward with respect to the lower rail 37. Therefore, in the slide range of the seat 12 in the front-rear direction in the normal mode, the wrap amount wrp at the rearmost position RRM is maximized at the slide position where the rear end 35b of the upper rail 35 moves rearward from the position coinciding with the rear end 37b of the lower rail 37. Hence, it is possible to have sufficient mechanical strength, impact resistance, loading resistance, and strain generation resistance in the normal mode.

As illustrated in the lower part of FIG. 3, the slide range in the relaxing mode is set to be rearward with respect to the slide range of the seat 12 in the front-rear direction in the normal mode. This is because in the relaxing mode an object is to create a large relaxing space, which has not been able to be realized so far inside the vehicle 10 without being obstructed by a steering wheel 15 (see FIG. 2) or the like. Therefore, at the super rear position RROM, the front end 35a of the upper rail 35 is positioned behind the front end 37a of the lower rail 37. At the super rear position RROM, the front end 35a of the upper rail 35 is positioned in front of the middle of the lower rail 37 in the front-rear direction.

At the super rear position RROM, the rear end 35b of the upper rail 35 is at a slide position protruding rearward with respect to the rear end 37b of the lower rail 37. At the super rear position RROM, the wrap amount wrp between the upper rail 35 and the lower rail 37 is about ⅔ of the front-rear direction dimension of the lower rail 37. That is, at the super rear position RROM, the front-rear direction distance from the front end 35a of the upper rail 35 to the rear end 37b of the lower rail 37 is about ⅔ of the front-rear direction dimension of the lower rail 37.

As described above, at the super rear position RROM, the wrap amount wrp between the upper rail 35 and the lower rail 37, i.e., the front-rear direction length of the upper rail 35 overlapping each other in the front-rear direction and supported by the lower rail 37 is larger than ⅔ of the front-rear direction length of the lower rail 37. In order to realize such wrap amount wrp between the upper rail 35 and the lower rail 37, the upper rail 35 in the present embodiment is extended in the front-rear direction as compared with the conventional upper rail.

At the super rear position RROM, the upper rail 35 does not further move rearward with respect to the lower rail 37. At the super rear position RROM, the upper rail 35 does not further move rearward with respect to the lower rail 37. Therefore, at the slide position of the seat 12 in the front-rear direction in the relaxing mode, the wrap amount wrp at the super rear position RROM is minimized, and the wrap amount wrp is not further reduced.

The super rear position RROM as the relaxing mode may be a region where the slide position in the front-rear direction is a predetermined range instead of one position.

In the super rear position RROM in the relaxing mode, at the slide position, a rear end G of a gravity center range applied to the seat cushion 31 from the seated driver in the normal mode is behind the rear end 37b of the lower rail 37.

The rear end G of the gravity center range is an end portion that is at the rearmost position in the front-rear direction within the gravity center range of the loading applied from the seated driver on the seat cushion 31 in the normal mode. Here, the position of the center of gravity applied from the seated driver in the front-rear direction varies depending on the inclination of the seat back 32, the posture of the seated person, and the like. For example, the gravity center position when the seat back 32 is inclined rearward is located further rearward than the gravity center position during driving when the seat back 32 is in a nearly upright state.

In this manner, the rearmost end position in the range of the gravity center position extending forward and rearward is the rear end G of the gravity center range. Specifically, the rear end G of the gravity center range is in the vicinity of the rear end portion of the seat cushion 31 immediately in front of a lower end of the seat back 32.

In the relaxing mode, a front-rear direction position of a hip point H in the seat cushion 31 is set to a slide position behind the rear end 37b of the lower rail 37. Here, the front-rear direction position of the hip point H is in the vicinity of the rear end portion of the seat cushion 31 immediately in front of the lower end of the seat back 32.

The slide rail 38 is inclined so as to lower from the front side toward the rear side, and the seat surface of the seat cushion 31 is also inclined so as to lower toward the rear side in a state where the lifting portion 54 described below is not operated. Therefore, the front-rear direction position of the hip point H is in the vicinity of the rear end portion of the seat cushion 31 immediately in front of the lower end of the seat back 32, and at the super rear position RROM where the upper rail 35 has moved rearward, the loading on the slide rail 38 is located further rearward.

Thus, the wrap amount wrp at the super rear position RROM is about ⅔ or less of the front-rear direction dimension of the lower rail 37. At the super rear position RROM, as will be described below, since the vehicle 10 is in the relaxing mode, i.e., in a stopped state, no loading other than the loading from the seated person is applied to the slide rail 38. Hence, even when the upper rail 35 and the lower rail 37 slide relative to each other from the foremost position FRM to the rearmost position RRM and the super rear position RROM as the normal mode and the relaxing mode, it is possible to have sufficient mechanical strength, impact resistance, loading resistance, and strain generation resistance.

As described above, since the slide rail 38 has the aforementioned constitution, it is possible to switch between the normal mode and the relaxing mode to realize both modes.

As illustrated in FIGS. 1 to 3, the lower rail 37 includes the slide drive portion (motor) 53. The slide drive portion 53 is provided on each of the left and right lower rails 37. The slide drive portion 53 is connected to the control unit 59. The slide drive portion 53 is supplied with power from a power supply, which is not illustrated, and slides the upper rail 35 in the front-rear direction with respect to the lower rail 37. The slide drive portion 53 includes a driving force transmission portion such as a gear, which is not illustrated. The slide drive portion 53 includes a detection unit that detects the front-rear direction position of the upper rail 35 with respect to the lower rail 37.

As will be described below, the slide drive portion (motor) 53 can be used to slide the seat body 33 in the front-rear direction for adjustment of the front-rear position in the normal mode and to slide the seat body 33 in the front-rear direction for mode switching.

The slide drive portion (motor) 53 is adjusted such that a drive speed in sliding of the seat body 33 in the front-rear direction for mode switching is higher than a drive speed in sliding of the seat body 33 in the front-rear direction for adjustment of the front-rear position in the normal mode. Specifically, in the slide drive portion (motor) 53, the drive speed for mode switching is about 2 to 3 times, for example, about 2.6 times higher than the drive speed for adjustment of the front-rear position in the normal mode.

As illustrated in FIGS. 1 and 2, the lifting portion 54 is provided in a lower portion of the seat body 33. The lifting portion 54 moves up and down the seat surface of the seat cushion 31. Specifically, the lifting portion 54 moves up and down the rear end of the seat surface of the seat cushion 31. The lifting portion 54 rises so that the seat surface of the seat cushion 31 the rear end of which is inclined downward in the normal mode described below becomes substantially horizontal when switched to the relaxing mode. The lifting portion 54 lowers so that the seat surface of the seat cushion 31 that is substantially horizontal in the relaxing mode to be described below has the rear end that is inclined downward when switched to the normal mode.

The lifting portion 54 is, for example, air cells, and can move the seat surface of the seat cushion 31 up and down by being supplied with air from an air supply portion, which is not illustrated. The lifting portion 54 is connected to the control unit 59. The lifting portion 54 can have another constitution as long as it can move the seat surface of the seat cushion 31 up and down.

As will be described below, the lifting portion 54 can be used to raise and lower the seat surface of the seat cushion 31 for adjustment of the up-down position in the normal mode and raise and lower the seat surface of the seat cushion 31 for mode switching.

As illustrated in FIGS. 1 and 2, the inclination drive portion 55 is provided at a lower end of the seat back 32. The inclination drive portion 55 inclines and drives to adjust an angle at which an upper end of the seat back 32 is inclined in the front-rear direction with respect to the lower end. The inclination drive portion 55 is connected to the control unit 59. The inclination drive portion 55 inclines and drives to adjust an angle at which the upper end of the seat back 32 is inclined in the front-rear direction with respect to the lower end by being supplied with power from a power supply, which is not illustrated. The inclination drive portion 55 is, for example, a motor, and includes the driving force transmission portion such as a gear, which is not illustrated.

The inclination drive portion 55 includes a detection unit that detects an inclination angle of the seat back 32. As will be described below, the inclination drive portion 55 can perform setting of the inclination position of the seat back 32 in the front-rear direction for adjustment of the inclination angle in the normal mode and setting of the inclination position of the seat back 32 in the front-rear direction at the time of mode switching.

As illustrated in FIGS. 1 and 2, the mode switching switch 57 is activated at the time of switching between the normal mode and the relaxing mode to be described below. The mode switching switch 57 is connected to the control unit 59. The mode switching switch 57 is disposed at a position where a seated person leaning on the seat back 32 in the relaxing mode cannot reach or operate in the same position. That is, the mode switching switch 57 is disposed such that the on/off operation can be performed only after sitting up and the loading applied to the seat 12 is moved forward in the state of being seated on the seat 12 positioned on the rear side in the relaxing mode.

Specifically, the mode switching switch 57 can be disposed on the front side of the roof portion of the vehicle 10 or in front of the steering wheel 15. The mode switching switch 57 is disposed on a map lamp module of the vehicle 10, an operation panel 16 of a center display in front of the steering wheel 15, or the like.

Furthermore, the mode switching switch 57 is constituted such that the direction of the switching operation is forward when the relaxing mode is switched to the normal mode. That is, when the mode switching switch 57 is a slide switch, it is necessary to move the switch forward at the time of mode switching to the normal mode.

With such a constitution, even in a state where the operator operating the mode switching switch 57 sits up to move the loading applied to the seat 12 forward and the lower rail 37 extends rearward, the operator can move the center of gravity applied to the slide mechanism 34 forward, suppress the overloading on the slide drive portion (motor) 53 in the slide mechanism 34, or reduce the occurrence of distortion on the slide rail 38 or the like, and perform the smooth mode switching operation.

The control unit 59 is connected to the slide drive portion (motor) 53, the lifting portion 54, the inclination drive portion 55, and the mode switching switch 57. When the ON signal is input from the mode switching switch 57, the control unit 59 outputs a switching signal for switching the mode by driving the slide drive portion (motor) 53, the lifting portion 54, and the inclination drive portion 55.

Hereinafter, the mode switching will be described.

First, a case where the normal mode during driving is switched to the relaxing mode will be considered. In this case, the slide mechanism 34 of the seat 12 is in the slide range in the normal mode, that is, at any slide position between the foremost position FRM and the rearmost position RRM illustrated in FIG. 3 in the front-rear direction. In the normal mode, the seat back 32 is assumed to be in both an upright angle state during driving and a reclining state of being inclined rearward.

In this state, the mode switching switch 57 is turned on to switch the mode to the relaxing mode.

Here, switching from the normal mode to the relaxing mode is enabled when the vehicle is stopped, that is, when the vehicle 10 is not in a driving state. Thus, first, it is determined whether the mode can be switched to the relaxing mode.

Figure 4:
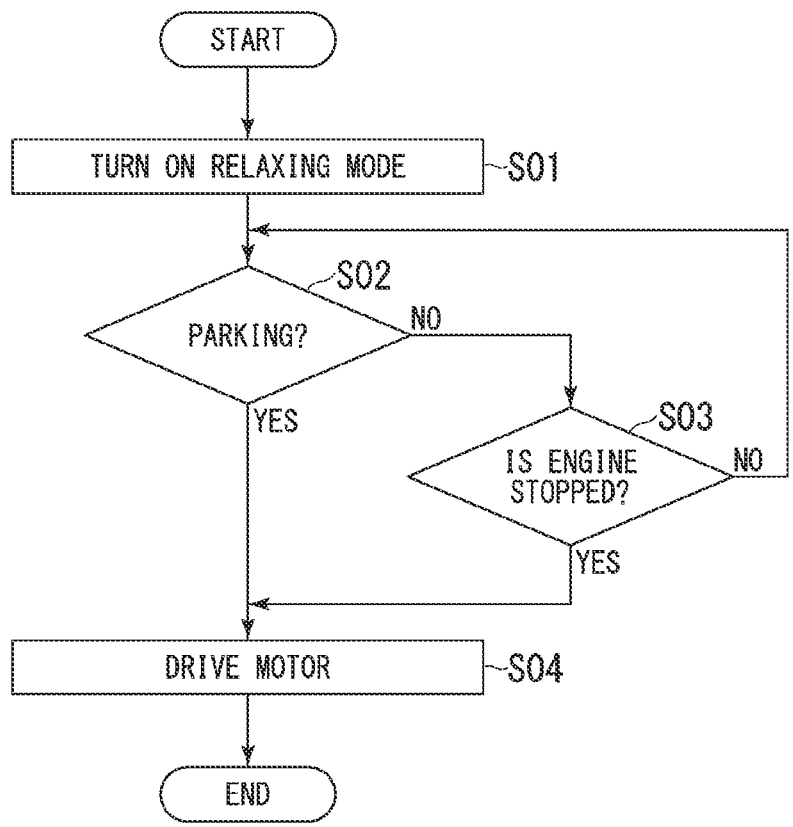
FIG. 4 is a flowchart illustrating switching from the normal mode to the relaxing mode in the first embodiment of the vehicle seat according to the present invention.

FIG. 4 is a flowchart illustrating switching from the normal mode to the relaxing mode in the present embodiment.

In the normal mode, when the mode switching switch 57 is turned on (step S01 in FIG. 4), the ON signal output from the mode switching switch 57 is input to the control unit 59. The control unit 59 determines whether the shift device is in the parking range (step S02 in FIG. 4). When the shift device is in the parking range, the control unit 59 outputs a drive signal to the slide drive portion (motor) 53 (step S04 in FIG. 4).

When the shift device is not in the parking range, the control unit 59 further determines whether the engine is in a stop state or an idling state (step S03 in FIG. 4). When the engine is in the stop state, the control unit 59 outputs a drive signal to the slide drive portion (motor) 53 (step S04 in FIG. 4).

When the engine is in an idling state, an alert urging to set the shift device to the parking range is output to the operator, and the processing returns to step S2 to determine again whether the shift device is in the parking range.

Hence, it is constituted not to be switched to the relaxing mode in a state where the vehicle 10 can travel, such as when the vehicle 10 is driving or idling when the shift device is in other than the parking range.

Figure 5:
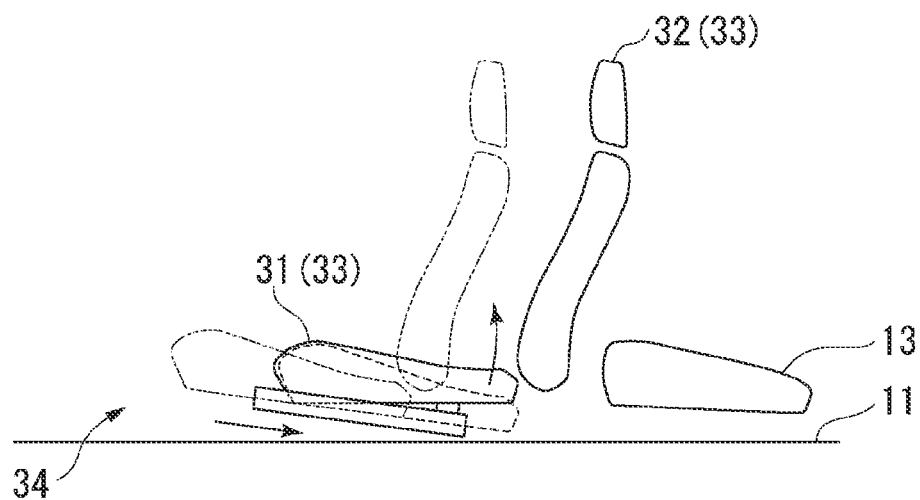
FIG. 5 is a schematic side diagram illustrating switching from the normal mode to the relaxing mode in the first embodiment of the vehicle seat according to the present invention.
Figure 6:
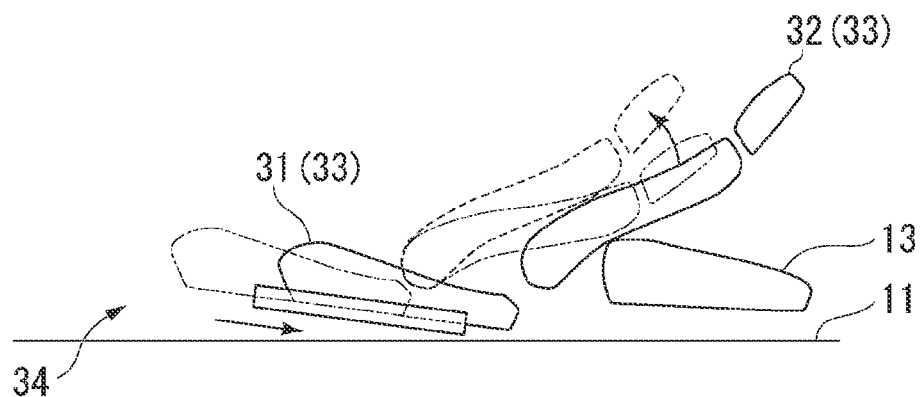
FIG. 6 is a schematic side diagram illustrating switching to the normal mode in the first embodiment of the vehicle seat according to the present invention.

FIG. 5 is a schematic side diagram illustrating switching from the normal mode to the relaxing mode in the present embodiment. FIG. 6 is a schematic side diagram illustrating switching from the normal mode to the relaxing mode in the present embodiment.

Here, as illustrated in FIG. 1, when the seat back 32 is in an upright angle state during driving, the slide drive portion (motor) 53 to which the drive signal has been input from the control unit 59 is driven. Hence, the upper rail 35 is moved rearward with respect to the lower rail 37 from the slide position in the normal mode indicated by the two-dot chain line in FIG. 5. Here, in the slide drive portion (motor) 53, the drive speed at the time of mode switching, i.e., the moving speed of the upper rail 35 with respect to the lower rail 37 is set to be larger than the case of the driving for seat position adjustment in the normal mode. Hence, in the seat position adjustment in the normal mode, fine position adjustment can be facilitated, and at the time of mode switching, the interior of the vehicle 10 can be quickly switched to the relaxing space by quickly moving the seat body 33 rearward.

Here, as indicated by the two-dot chain line in FIG. 6, when the seat back 32 is in a reclining state of being inclined rearward as compared with the upright angle during driving, the control unit 59 first outputs the drive signal to the inclination drive portion 55 before outputting the drive signal to the slide drive portion (motor) 53. As indicated by the broken line in FIG. 6, the inclination drive portion 55 to which the drive signal has been input causes the seat back 32 to rise up to an angle at which switching to the relaxing mode is possible. Next, when the seat back 32 rises up to a predetermined angle, the control unit 59 stops the driving of the inclination drive portion 55. Then, the control unit 59 outputs the drive signal to the slide drive portion (motor) 53 to move the seat body 33 rearward.

In this case, whether to drive the inclination drive portion 55 or not depends on the inclination angle of the seat back 32. That is, the inclination drive portion 55 is driven when the defect that the seat back 32 interferes with the rear row seat 13 occurs when the seat back 32 is inclined and the seat body 33 is moved rearward. Even when the seat back 32 is inclined, the inclination drive portion 55 is not driven when the inclination is so small that the defect that the seat back 32 interferes with the rear row seat 13 does not occur when the seat body 33 is moved rearward. The inclination angle of the seat back 32, which serves as the criterion for determining whether the inclination drive portion 55 is to be driven, is set in advance and stored in the control unit 59. The inclination drive portion 55 includes the detection unit that detects the inclination angle of the seat back 32 and can output the detection result to the control unit 59.

The upper rail 35 driven rearward by the slide drive portion (motor) 53 moves rearward with respect to the lower rail 37, and the slide position slides to the super rear position RROM and stops (see the lower part of FIG. 3). Hence, as indicated by the solid line in FIG. 5, the slide position in the relaxing mode is obtained. In the slide position in the relaxing mode, the footrest low floor portion 11a located and hidden below the seat cushion 31 in the normal mode appears and becomes usable. Hence, unlike during driving, it is easy for the seated person to stretch the legs and relax.

In a state immediately after the slide position has moved to the super rear position RROM, the rear end of the seat surface of the seat cushion 31 is inclined downward as in the normal mode as indicated by the broken lines in FIGS. 2 and 5.

After the seat body 33 slides at the super rear position RROM and the slide drive portion (motor) 53 is stopped, the control unit 59 outputs the drive signal to the lifting portion 54. Then, in the lifting portion 54 to which the drive signal has been input, the air cells supplied with air from the air supply portion, which is not illustrated, raise the rear end of the seat surface of the seat cushion 31, and the seat surface of the seat cushion 31 is made substantially horizontal as indicated by the solid lines in FIGS. 2 and 5. Hence, the switching to the relaxing mode is completed.

When the mode is switched to the relaxing mode, the seat back 32 can be brought into a slightly reclining state as long as it does not interfere with the rear row seat 13 as illustrated in FIG. 5. Alternatively, the operator can set the seat back 32 to a desired angle. The seat surface of the seat cushion 31 may not rise to be substantially horizontal or can be set to a desired angle by the operator after rising.

Next, switching from the relaxing mode to the normal mode will be described.

First, a case where the relaxing mode is switched to the normal mode will be considered. In this case, the slide mechanism 34 of the seat 12 is at the slide position, which becomes the super rear position RROM. In the relaxing mode, the seat back 32 is assumed to be in both an upright angle state as in the case of driving and a reclining state of being inclined rearward. It is conceivable that the seat surface of the seat cushion 31 is in a state of being raised to be substantially horizontal or in a state where the rear end of the seat surface of the seat cushion 31 is further lowered.

In this state, the mode switching switch 57 is turned on to switch the mode from the relaxing mode to the normal mode.

At this time, since the direction of the switching operation of the mode switching switch 57 is forward, when the switching operation is performed, even in a state where the operator sits up to move the loading applied to the seat 12 forward and the lower rail 37 extends rearward, the center of gravity applied to the slide mechanism 34 is moved forward. Hence, the load on the slide mechanism 34 is reduced.

Figure 7:
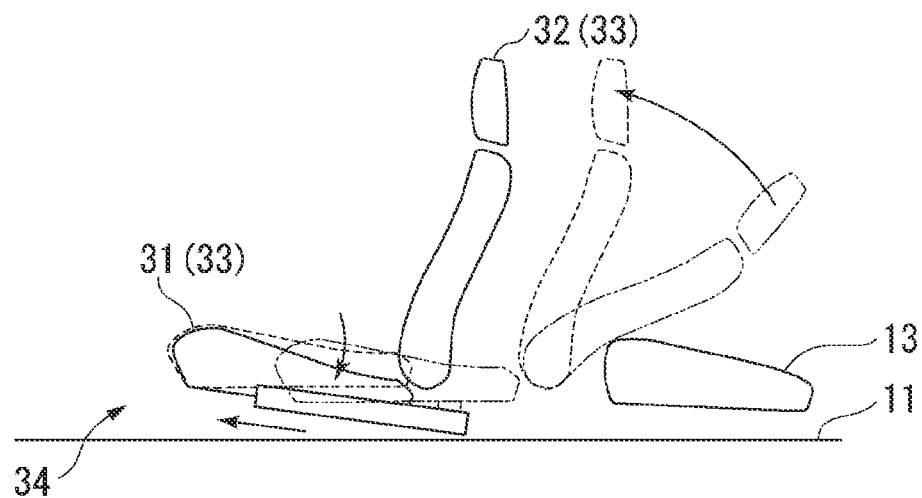
FIG. 7 is a schematic side diagram illustrating switching to the relaxing mode in the first embodiment of the vehicle seat according to the present invention.
Figure 8:
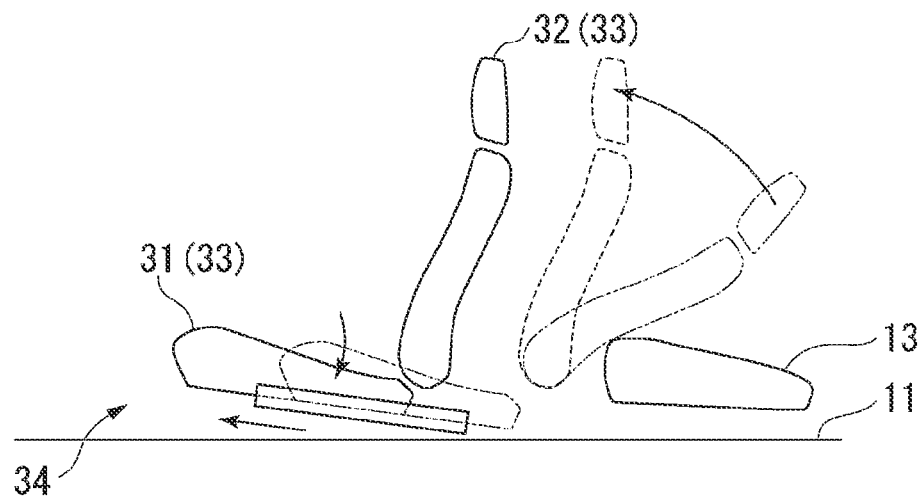
FIG. 8 is a schematic side diagram illustrating switching to the normal mode in the first embodiment of the vehicle seat according to the present invention.

FIG. 7 is a schematic side diagram illustrating switching from the relaxing mode to the normal mode in the present embodiment. FIG. 8 is a schematic side diagram illustrating switching from the relaxing mode to the normal mode in the present embodiment.

Here, as indicated by the two-dot chain line in FIG. 7, a case where the seat back 32 is in a reclining state of being inclined rearward as compared with the upright angle during driving is considered. Furthermore, here, a case where the seat surface of the seat cushion 31 is in a state of being raised to be substantially horizontal is considered.

In this case, first, before outputting the drive signal to the slide drive portion (motor) 53, the control unit 59 first outputs the drive signal to the inclination drive portion 55. As indicated by the broken line in FIG. 7, the inclination drive portion 55 to which the drive signal has been input causes the seat back 32 to rise up to an angle at which switching to the relaxing mode is possible. Next, when the seat back 32 rises up to a predetermined angle, the control unit 59 stops the driving of the inclination drive portion 55.

In this case, whether to drive the inclination drive portion 55 or not depends on the inclination angle of the seat back 32. However, unlike the switching from the normal mode to the relaxing mode, in this case, when the seat back 32 is in a state of being more or less reclined, the inclination drive portion 55 is driven. The inclination angle of the seat back 32, which serves as the criterion for determining whether the inclination drive portion 55 is to be driven, is set in advance and stored in the control unit 59.

In this state, as indicated by the broken line in FIG. 7, the state where the seat surface of the seat cushion 31 is raised to be substantially horizontal is maintained.

Next, the control unit 59 outputs the drive signal to the slide drive portion (motor) 53 to move the seat body 33 forward. During this forward and rearward movement, the state where the seat surface of the seat cushion 31 is raised to be substantially horizontal is maintained. Hence, the center of gravity of the seated person is located forward as compared with the state where the rear end of the seat surface of the seat cushion 31 is lowered. Hence, the overload in the slide mechanism 34 can be reduced.

After the seat body 33 slides to the position between the rearmost position RRM and the foremost position FRM and the slide drive portion (motor) 53 is stopped, the control unit 59 outputs the drive signal to the lifting portion 54. Then, in the lifting portion 54 to which the drive signal has been input, the air cells that have returned the air to the air supply portion, which is not illustrated, lower the rear end of the seat surface of the seat cushion 31, and the seat surface of the seat cushion 31 is lowered to be at the same inclination position as in the normal mode during driving as indicated by the solid line in FIG. 7. Hence, the switching to the normal mode is completed.

When switching from the relaxing mode to the normal mode in a state where the rear end of the seat surface of the seat cushion 31 is lowered, the seat back 32 is raised from the reclining position indicated by the two-dot chain line in FIG. 8 to the position indicated by the broken line in FIG. 8, and then the seat body 33 is caused to slide forward to the slide position indicated by the solid line in FIG. 8 to complete the switching to the normal mode.

When a table T is manually deployed from a console unit in the relaxing mode, the table T is stored in advance. Also in this case, similarly to the determination as to the parking range described above, when the table T is not stored, an alert instructing to store the table T is issued.

In a case where an obstacle placed on the footrest low floor portion 11a obstructs forward movement of the front end of the seat cushion 31, or in a case where the overload is applied to the slide drive portion 53, it is possible to provide the constitution of stopping the driving and issuing a similar alert.

In the present embodiment, with the slide mechanism 34 constituted as described above, it is possible to create a relaxing space, which has not been conventionally realized, inside the vehicle 10 by the mode switching.

That is, by switching from the normal mode, which is the driving position for driving, to the relaxing mode by the slide mechanism 34, the seat body 33 can be positioned further rearward with respect to the slide range in the normal mode, which is the conventional slide range in which the driving is possible. Hence, the relaxing mode and the static mode in which the table T can be used without being obstructed by the steering wheel 15 or the like and the relaxing space, which cannot conventionally be realized, is created inside the vehicle are enabled. Furthermore, although a sunroof 17 is conventionally mainly of the rear seat 13, the sunroof 17 of the front row seat 12 also gives a good feeling. In addition, the mode can be switched from the normal mode to the relaxing mode only by operating the mode switching switch 57, and the mode can be switched from the relaxing mode to the normal mode only by operating the mode switching switch 57.

At this time, in a case where the seat back 32 is inclined in the relaxing mode, the seat body 33 is prevented from being sliding so that the center of gravity becomes considerably on the rear side in the reclining state and in a state where the seated person is leaning. Prior to this, the seat back 32 is raised to the inclination position in the normal mode to move the center of gravity forward, and then the seat body 33 is moved forward to the slide position in the normal mode. The driving of the lifting portion 54 is controlled to prevent the center of gravity from being considerably on the rear side without releasing the inclination of the seat surface of the seat cushion 31. Hence, the burden applied to the rails and the motor is reduced, and it is possible to avoid the possibility of occurrence of defects such as a large deflection of the rails or a large burden on the motor of the slide drive portion or the like.

When switching from the relaxing mode to the normal mode, since the direction of the switching operation of the mode switching switch 57 is forward, when the switching operation is performed, even in a state where the operator sits up to move the loading applied to the seat 12 forward and the lower rail 37 extends rearward, the center of gravity applied to the slide mechanism 34 is moved forward. Hence, the load on the slide mechanism 34 can be reduced.

What is claimed is:

1. A vehicle seat comprising:
a seat that includes a seat cushion and a seat back;
an inclination drive portion configured to incline the seat back; and
a slide mechanism configured to enable the seat to slide in a vehicle front-rear direction, wherein
the slide mechanism includes
a slide rail that includes an upper rail fixed to the seat and a lower rail fixed to a vehicle body floor and slidably movable in a front-rear direction with respect to the lower rail, the slide rail supporting the seat to be able to move in a sliding manner in the front-rear direction,
a slide drive portion configured to enable the upper rail to slide with respect to the lower rail, and
a mode switching switch configured to drive the slide drive portion to enable switching between a normal mode during driving and a relaxing mode,
in the normal mode, a slide range of the seat in the front-rear direction is a slide amount used when the vehicle is driven,
in the relaxing mode, the slide range of the seat in the front-rear direction is rearward, with respect to a slide position at a rearmost end in the normal mode, and
when the relaxing mode is switched to the normal mode by the mode switching switch,
in a case where the seat back is inclined in the relaxing mode, the inclination drive portion is first driven to raise the seat back to an inclination position in the normal mode, and then the slide drive portion is driven to move the seat forward to the slide position in the normal mode.

2. The vehicle seat according to claim 1, wherein
in the relaxing mode,
a rear end of the upper rail is at a slide position of the seat protruding rearward with respect to a rear end of the lower rail, and
a rear end of a gravity center range applied to the seat cushion from a seated driver in the normal mode is set to a slide position of the seat located behind the rear end of the lower rail.

3. The vehicle seat according to claim 1, wherein
within the slide range of the seat in the front-rear direction in the normal mode,
at a foremost slide position, a front end of the upper rail protrudes forward with respect to a front end of the lower rail, and a wrap amount between the upper rail and the lower rail is half or more of a front-rear direction dimension of the lower rail,
at a rearmost slide position, the front end of the upper rail protrudes forward with respect to the front end of the lower rail, a rear end of the upper rail protrudes rearward with respect to a rear end of the lower rail, and the wrap amount between the upper rail and the lower rail becomes an entire front-rear direction dimension of the lower rail, and
at the rearmost slide position within the slide position of the seat in the front-rear direction in the relaxing mode, the rear end of the upper rail protrudes rearward with respect to the rear end of the lower rail, and the wrap amount between the upper rail and the lower rail is ⅔ or less of a front-rear direction dimension of the lower rail.

4. The vehicle seat according to claim 1, wherein
in the relaxing mode,
a front-rear direction position of a hip point in the seat cushion is set to a slide position of the seat behind a rear end of the lower rail.

5. The vehicle seat according to claim 4, wherein
the seat includes a lifting portion configured to lift up a rear portion of a seat surface of the seat cushion in the relaxing mode, and
when the relaxing mode is switched to the normal mode by the mode switch, in a case where the seat back is inclined in the relaxing mode, the inclination drive portion is first driven to raise the seat back to the inclination position in the normal mode, and then the lifting portion is driven to move the rear portion of the seat surface of the seat cushion downward to a position of the normal mode.

6. The vehicle seat according to claim 5, wherein regarding a moving speed of the seat in the front-rear direction by the slide drive portion, a moving speed at a time of switching between the normal mode and the relaxing mode is higher than a moving speed in the normal mode.

7. The vehicle seat according to claim 6, wherein the vehicle body floor includes a footrest low floor portion hidden by the seat in the normal mode and usable by a seated driver in the relaxing mode.

* * * * *